United States Patent [19]

Maddern

[11] Patent Number: 4,587,649
[45] Date of Patent: May 6, 1986

[54] METHOD OF GROWTH OF A DIGITAL SWITCHBLOCK

[75] Inventor: Thomas S. Maddern, Dorset, Great Britain

[73] Assignee: The Plessey Company plc, Ilford, England

[21] Appl. No.: 783,279

[22] Filed: Oct. 4, 1985

Related U.S. Application Data

[63] Continuation of Ser. No. 543,949, Oct. 20, 1983, abandoned.

[30] Foreign Application Priority Data

Oct. 21, 1982 [GB] United Kingdom ............... 8230075

[51] Int. Cl.⁴ .......................................... H04Q 11/04
[52] U.S. Cl. ........................................ 370/58; 370/64
[58] Field of Search ...................... 370/58, 59, 63, 64

[56] References Cited

U.S. PATENT DOCUMENTS

| | | | |
|---|---|---|---|
| 4,074,077 | 2/1978 | Charransol | 370/58 |
| 4,075,608 | 2/1978 | Koenig | 370/58 |
| 4,096,354 | 6/1978 | Bleickardt et al. | 179/15 BF |
| 4,201,891 | 5/1980 | Lawrence et al. | 370/58 |
| 4,393,490 | 7/1983 | Culley | 370/13 |
| 4,397,020 | 8/1983 | Howson | 370/105 |
| 4,425,640 | 1/1984 | Philip et al. | 370/58 |
| 4,442,502 | 4/1984 | Friend et al. | 370/58 |

FOREIGN PATENT DOCUMENTS 2074815A 11/1981 United Kingdom .
2083319A 3/1982 United Kingdom .

Primary Examiner—Douglas W. Olms
Assistant Examiner—Kenneth I. Rokoff
Attorney, Agent, or Firm—Fleit, Jacobson, Cohn & Price

[57] ABSTRACT

The method of growth of the digital switchblock is for use in telecommunications. The switchblock comprises a plurality of superplanes each including a plurality of central digital switching modules interconnected to a plurality of demultiplexer-mixer-remultiplexer stages; and, a plurality of outer digital switching modules connected to the demultiplexer-mixer-remultiplexer stages on each side of the superplanes. The outer digital switching modules are increased linearly as the number of telecommunication lines is increased from a first order of telecommunication lines. The number of superplanes is increased linearly as the number of telecommunication lines increase from the first order of telecommunication lines to a second order of telecommunication lines and thereafter remain constant as the number of lines increase. The central digital switching modules are increased thereafter in accordance with a square law growth characteristic when the number of lines is increased from the second order of telecommunication lines.

5 Claims, 13 Drawing Figures

OUTER SWITCHING STAGE

CENTRAL SWITCHING STAGE

OUTER SWITCHING STAGE    CENTRAL SWITCHING STAGE

| 0B | = EXISTING CABLES WHICH MOVED POSITION DURING SWITCH BLOCK GROWTH FROM 128 TO 129 PCM LINES |
| 2A | = NEW CABLES ADDED DURING SWITCH BLOCK GROWTH FROM 129 TO 256 PCM LINES |

| SIZE PCM LINES | SUPERPLANES | | DSMS | | | | | | DMRS TOTAL | |
|---|---|---|---|---|---|---|---|---|---|---|
| | | | RX STAGE | | TX STAGE | | CENTRAL STAGE | | | |
| | SIZE | NOS | SIZE | NOS | SIZE | NOS | SIZE | NOS | SIZE | NOS |
| 1 | 32X32 | 4 | 16X16 | 1 | 16X16 | 1 | 8X8 | 16 | 4X4 | 32 |
| $\downarrow n_1$ | 32X32 | 4 | 16X16 | $\left\lceil \frac{n_1}{16} \right\rceil +1$ / 8 | 16X16 | $\left\lceil \frac{n_1}{16} \right\rceil +1$ / 8 | 8X8 | 16 | 4X4 | $32 \times \left( \left\lceil \frac{n_1}{64} \right\rceil +1 \right)$ / 64 |
| 128 | 32X32 | 4 | 16X16 | 8 | 16X16 | 8 | 8X8 | 16 | 4X4 | 64 |
| ADD 4 SUPERPLANES | | | RECONFIGURE 64 RX & TX LINKS | | | | TOTAL 8 10 PAIR CABLES | | | |
| 129 | 32X32 | 8 | 16X16 | 9 | 16X16 | 9 | 8X8 | 32 | 4X4 | 96 |
| $\downarrow n_2$ | 32X32 | 8 | 16X16 | $\left\lceil \frac{n_2}{16} \right\rceil +1$ / 16 | 16X16 | $\left\lceil \frac{n_2}{16} \right\rceil +1$ / 16 | 8X8 | 32 | 4X4 | $32 \times \left( \left\lceil \frac{n_2}{64} \right\rceil +1 \right)$ / 128 |
| 256 | 32X32 | 8 | 16X16 | 16 | 16X16 | 16 | 8X8 | 32 | 4X4 | 128 |
| ADD 8 SUPERPLANES | | | RECONFIGURE 128 RX & TX LINKS | | | | TOTAL 16 10 PAIR CABLES | | | |
| 257 | 32X32 | 16 | 16X16 | 17 | 16X16 | 17 | 8X8 | 64 | 4X4 | 160 |
| $\downarrow n_3$ | 32X32 | 16 | 16X16 | $\left\lceil \frac{n_3}{16} \right\rceil +1$ / 32 | 16X16 | $\left\lceil \frac{n_3}{16} \right\rceil +1$ / 32 | 8X8 | 64 | 4X4 | $32 \times \left( \left\lceil \frac{n_3}{64} \right\rceil +1 \right)$ / 256 |
| 512 | 32X32 | 16 | 16X16 | 32 | 16X16 | 32 | 8X8 | 64 | 4X4 | 256 |

Fig. 12a

| INCREASE SIZE OF CENTRAL DSM TO 16×16 | | | | | | | |
|---|---|---|---|---|---|---|---|
| 513 ↓ $n_4$ ↓ 1024 | 64×64 | 16 | 16×16 | 33 $\left[\frac{n_4}{16}\right]+1$ 64 | 16×16 | 64 | 4×4 | 288 $32\times\left(\left[\frac{n_4}{64}\right]+1\right)$ 512 |
| | 64×64 | 16 | 16×16 | 16×16 | 16×16 | 64 | 4×4 | |
| | 64×64 | 16 | 16×16 | 16×16 | 16×16 | 64 | 4×4 | |

| INCREASE SIZE OF CENTRAL DSM TO 32×32 | | | | | | | |
|---|---|---|---|---|---|---|---|
| 1025 ↓ $n_5$ ↓ 2048 | 128×128 | 16 | 16×16 | 65 $\left[\frac{n_5}{16}\right]+1$ 128 | 16×16 | 64 | 4×4 | 544 $32\times\left(\left[\frac{n_5}{64}\right]+1\right)$ 1024 |
| | 128×128 | 16 | 16×16 | 16×16 | 32×32 | 64 | 4×4 | |
| | 128×128 | 16 | 16×16 | 16×16 | 32×32 | 64 | 4×4 | |
| | | | | | 32×32 | 64 | 4×4 | |

| INCREASE SIZE OF CENTRAL DSM TO 48×48 | | | | | | | |
|---|---|---|---|---|---|---|---|
| 2049 ↓ $n_6$ ↓ 3072 | 192×192 | 16 | 16×16 | 129 $\left[\frac{n_6}{16}\right]+1$ 192 | 16×16 | 64 | 4×4 | 1056 $32\times\left(\left[\frac{n_6}{64}\right]+1\right)$ 1536 |
| | 192×192 | 16 | 16×16 | 16×16 | 48×48 | 64 | 4×4 | |
| | 192×192 | 16 | 16×16 | 16×16 | 48×48 | 64 | 4×4 | |
| | | | | | 48×48 | | | |

METHOD OF GROWTH OF A DIGITAL SWITCHBLOCK

This is a continuation of application Ser. No. 543,949, filed Oct. 20, 1983, now abandoned.

BACKGROUND

The present invention relates to a method of growth of a digital switchblock in the telecommunications environment.

The size of a switchblock is related to the number of pulse code modulated PCM transmission lines the switchblock has to handle. The main problem in designing and partitioning structure is the incorporation of the ability of the switchblock to grow over an extensive size range while offering an efficient implementation at all switchblock sizes.

Accordingly an aim of the present invention is to provide a method for the growth of a digital switchblock capability which can be efficiently increased as the number of PCM lines is increased.

SUMMARY

According to the present invention there is provided a method of growth of a digital switchblock for use in telecommunications, which switchblock comprising a plurality of superplanes each including a plurality of central digital switching modules which are interconnected to a plurality of demultiplexer-mixer-remultiplexer stages; and, a plurality of outer digital switching modules which are connected to the demultiplexer-mixer-remultiplexer stages on each side of the superplanes, wherein the outer digital switching modules are increased substantially linearly as the number of telecommunication lines is increased from a first order of telecommunication lines, and, the number of superplanes is increased substantially linearly as the number of telecommunication lines increase from the first order of telecommunication lines to a second order of telecommunication lines and thereafter remain constant as the number of telecommunication lines increase, whereas the central digital switching modules are increased thereafter in accordance with a square law growth characteristic when the number of telecommunication lines is increased from the second order of telecommunication lines.

BRIEF DESCRIPTION OF THE DRAWINGS

An embodiment of the invention will now be described with reference to the accompanying drawings wherein:

FIGS. 12a and 12b show a table of switchblock growth.

DETAILED DESCRIPTION

Referring now to FIGS. 1 to 6, the switchblocks shown accommodate different numbers of PCM lines.

Figure 1:
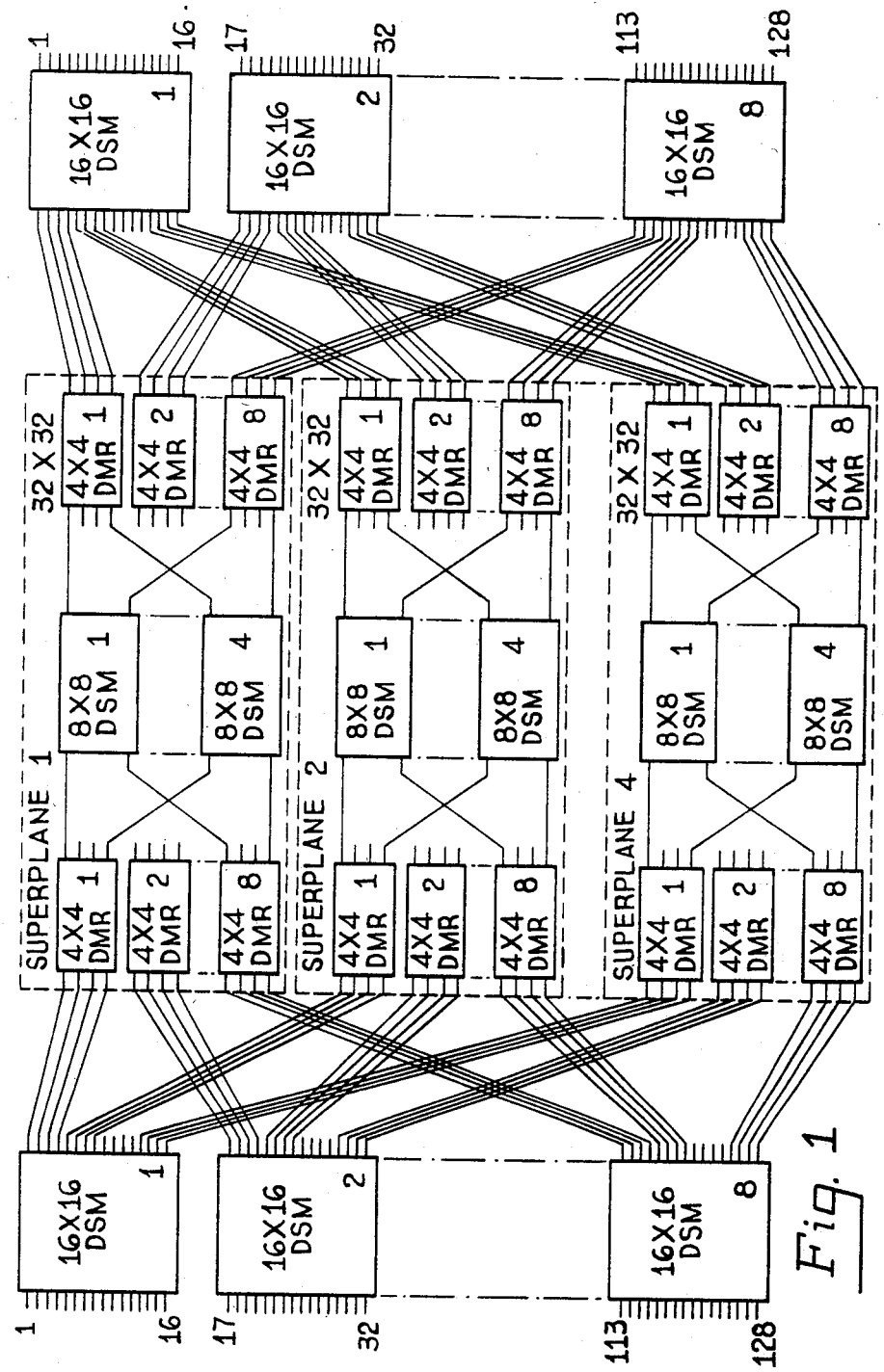
FIG. 1 shows a switchblock for 128 PCM lines.

Each switchblock comprises a number of outer digital switching modules, for example DSM 1-8, FIG. 1, and a number of central digital switching modules DSM 1-4, FIG. 1, arranged in superplanes 1-4. Each digital switching module provides digital PCM switching in a space-time-space format. Each module is unidirectional in operation and is capable of switching digitally coded speech from any incoming channel to any outgoing channel. A more detailed description of the digital switching module is disclosed in British patent application No. 2083319A. Each superplane also includes a number of demultiplexer-mixer-remultiplexer stages, DMR 1-8, FIG. 1, which interconnect the outer digital switching modules with the central digital switching modules. Each DMR stage is used to provide a preset time/space switching function and acts as a pre-programmed or counter driven digital switching module. Adjustment of the DMR function makes possible the provision of a wide range of switch sizes. A more detailed description of a demultiplexer-mixer-remultiplexer is disclosed in British patent application No. 2074815A.

Figure 2:
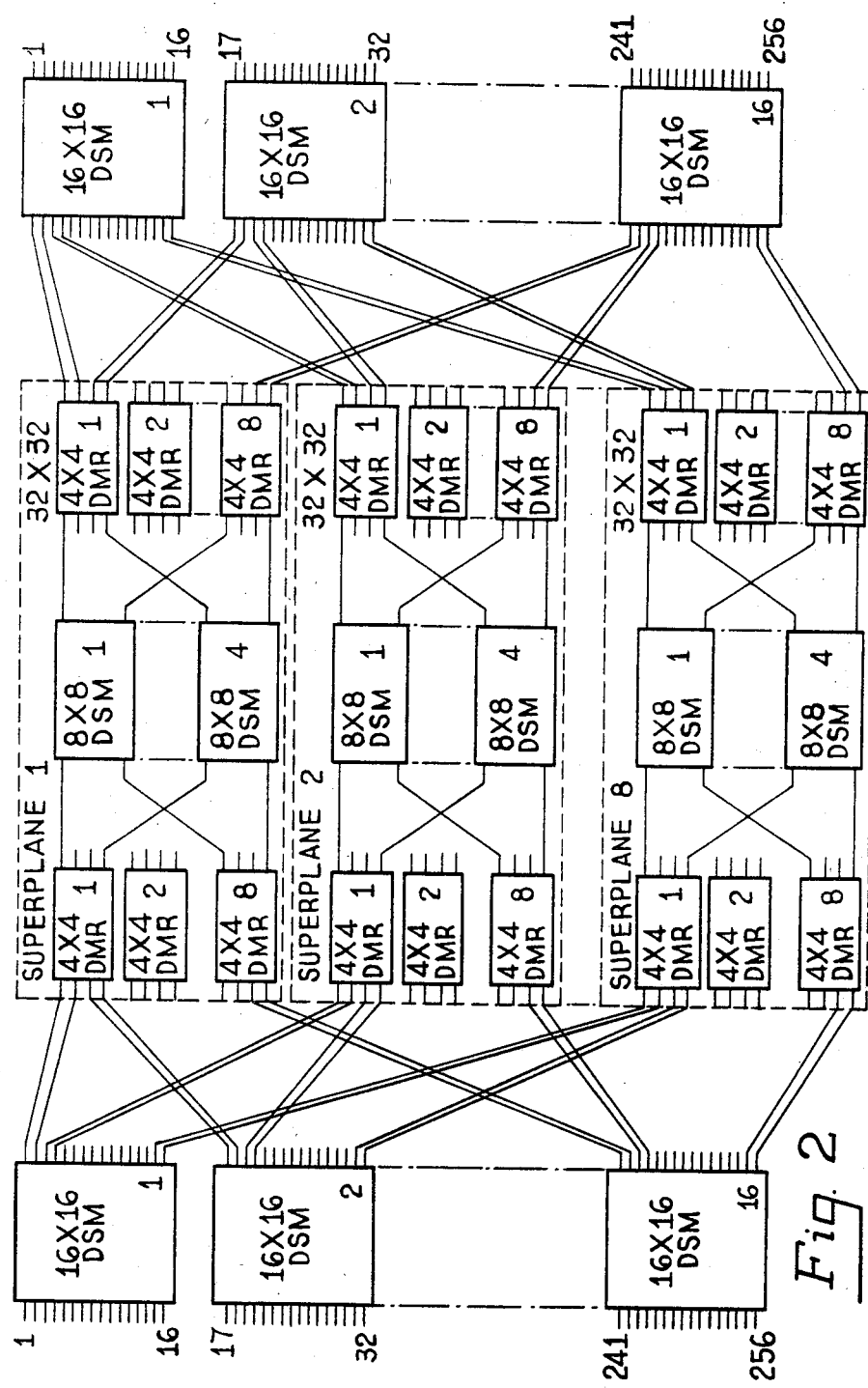
FIG. 2 shows a switchblock for 256 PCM lines.
Figure 3:
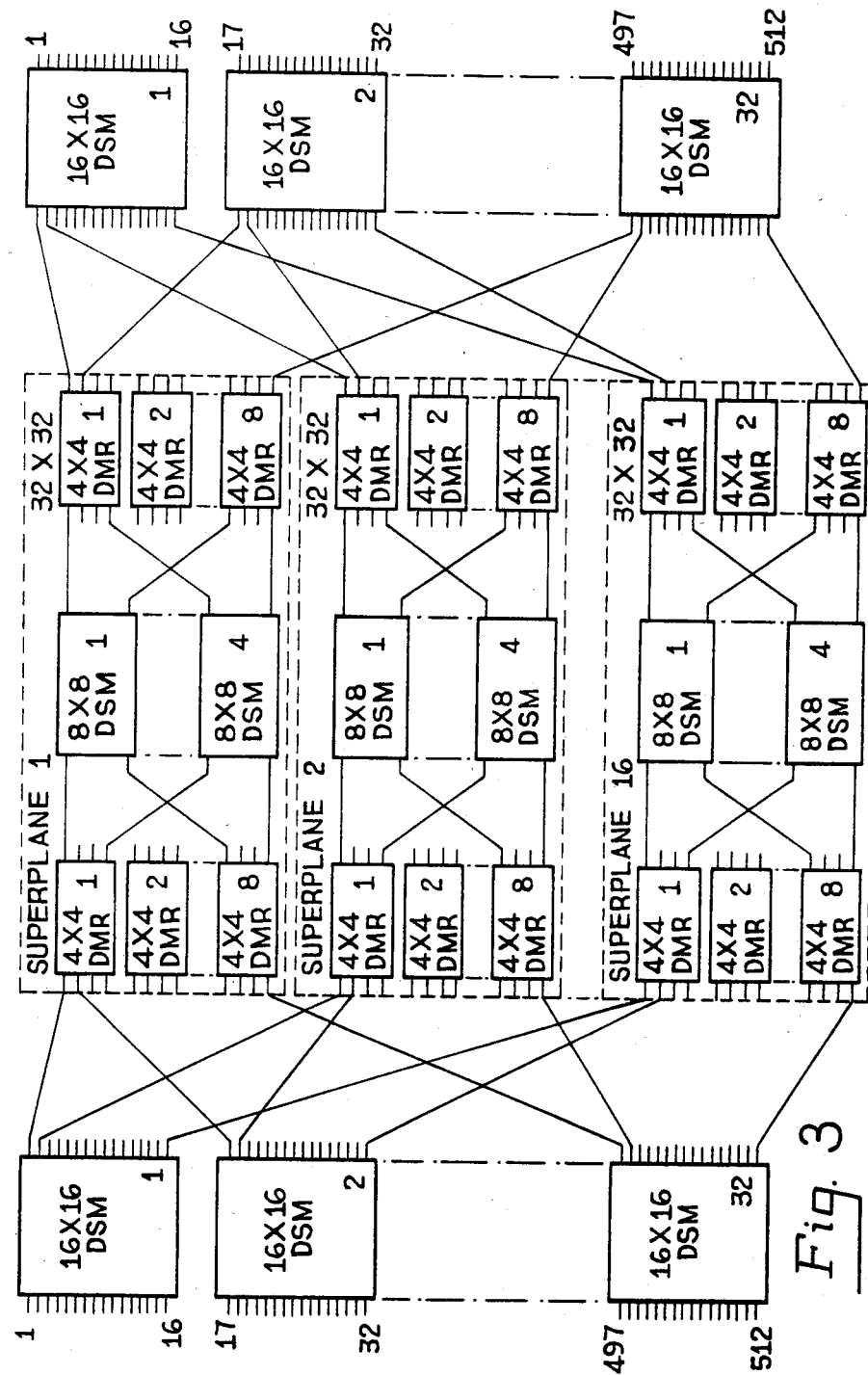
FIG. 3 shows a switchblock for 512 PCM lines.
Figure 4:
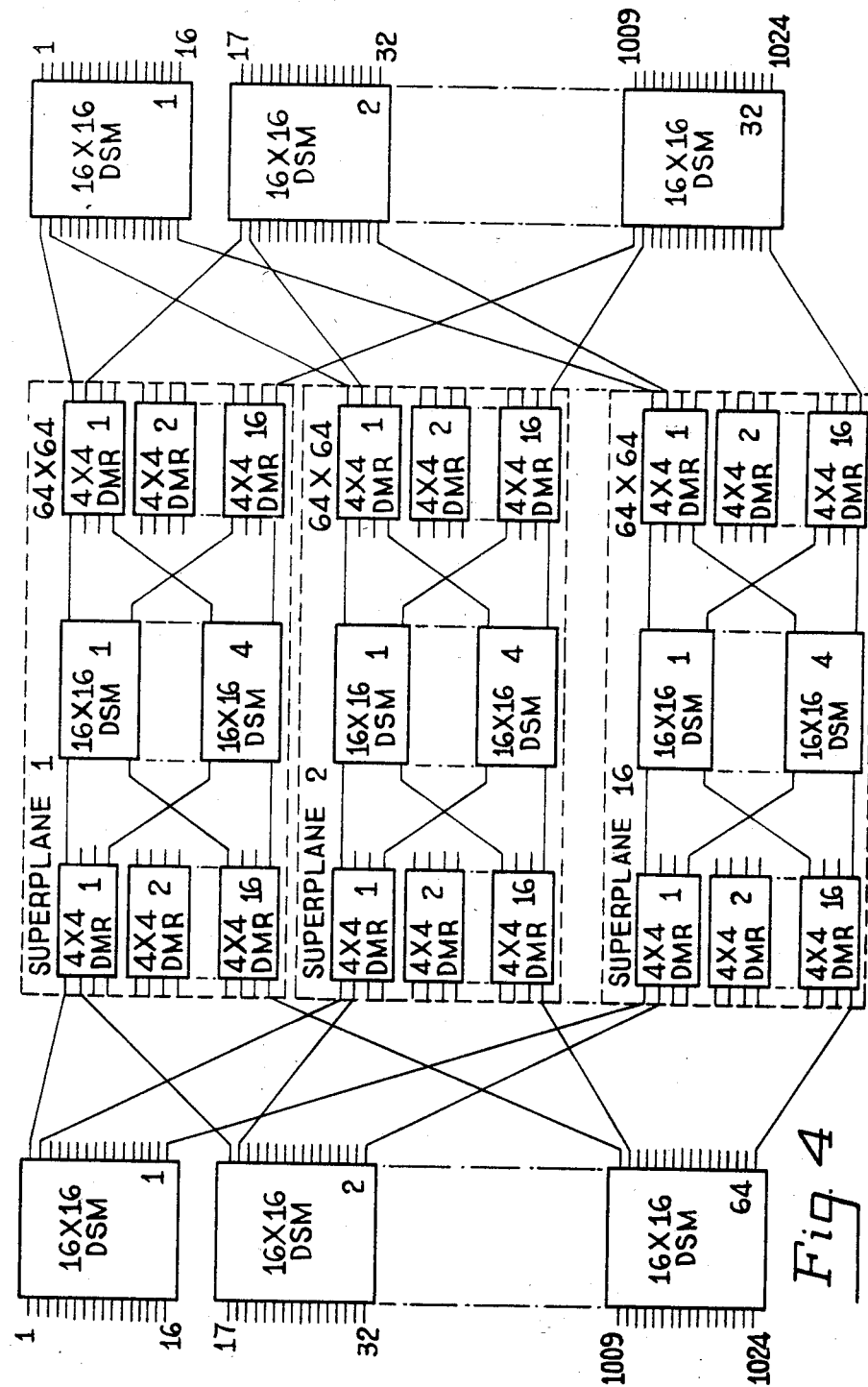
FIG. 4 shows a switchblock for 1042 PCM lines.
Figure 5:
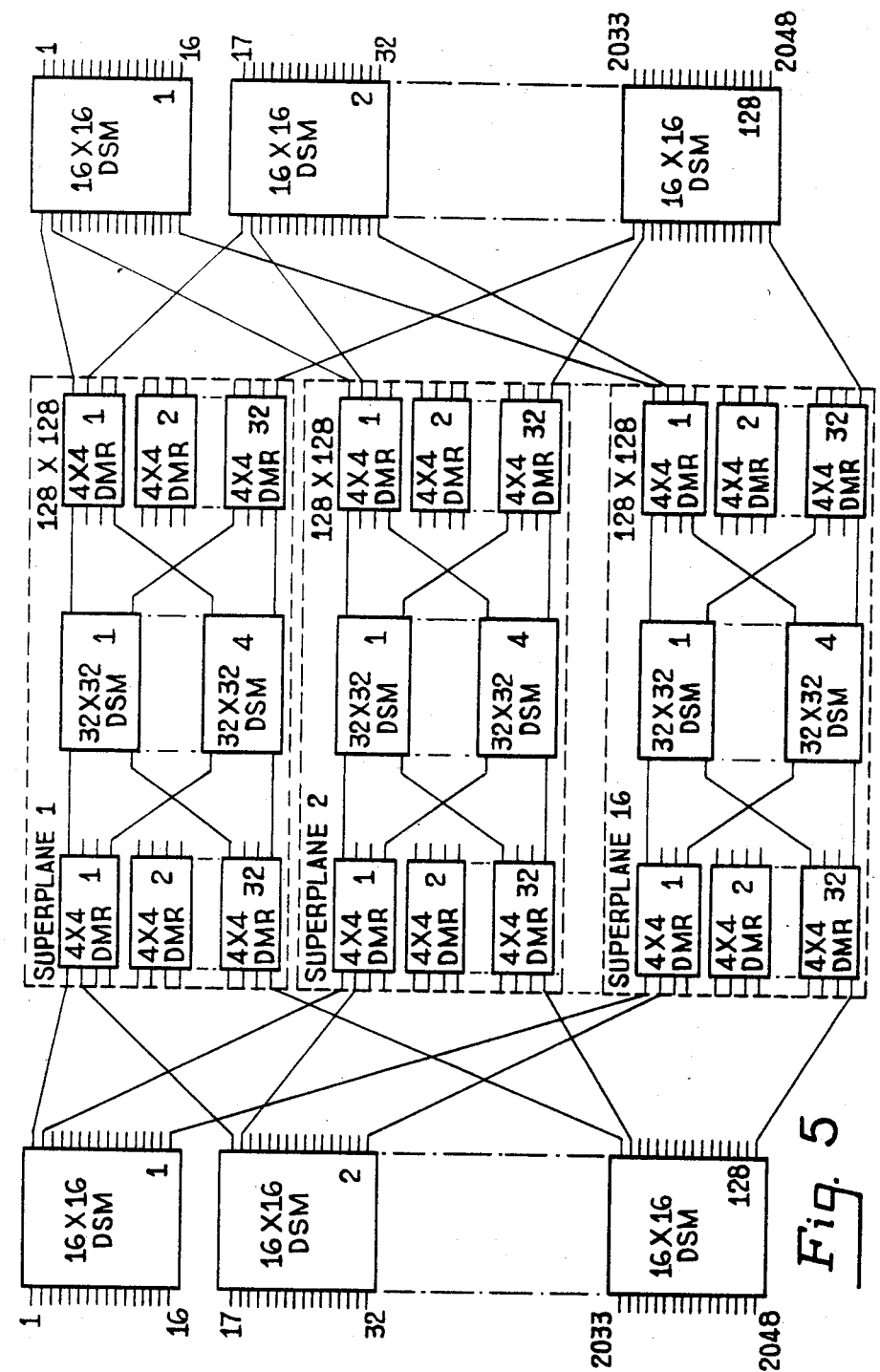
FIG. 5 shows a switchblock for 2048 PCM lines.
Figure 6:
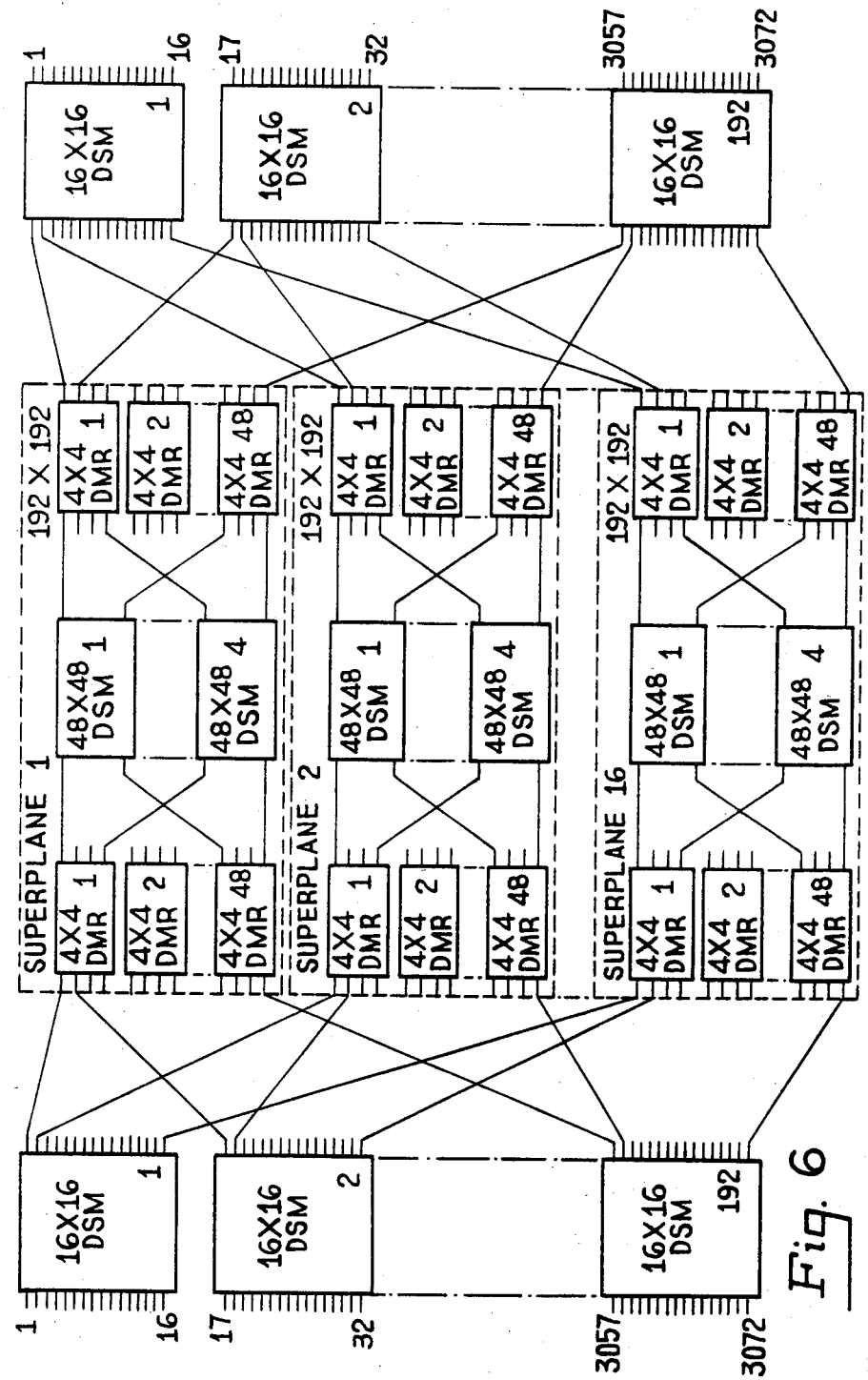
FIG. 6 shows a switchblock for 3072 PCM lines.
Figure 7:
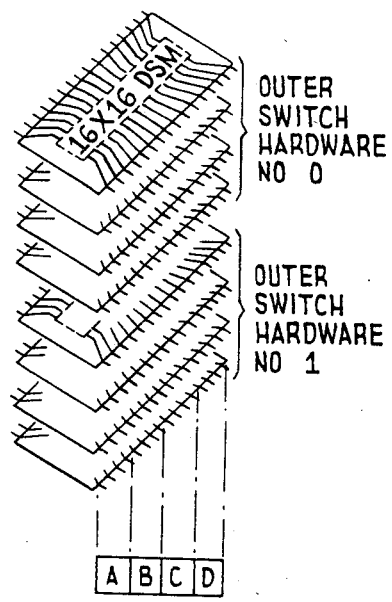
FIG. 7 shows switchblock 10 pair cabling for 128 PCM lines.
Figure 7:
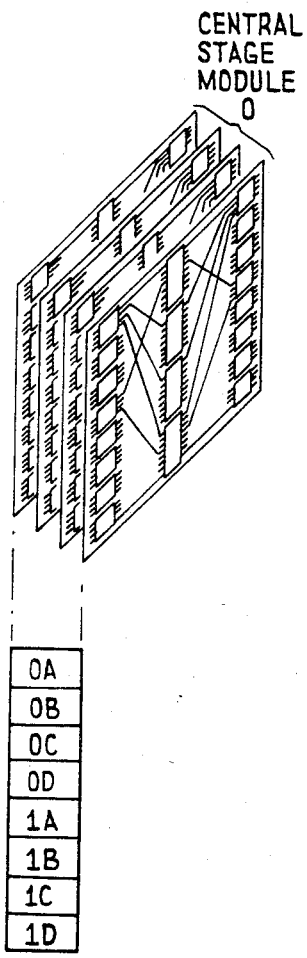
Figure 8:
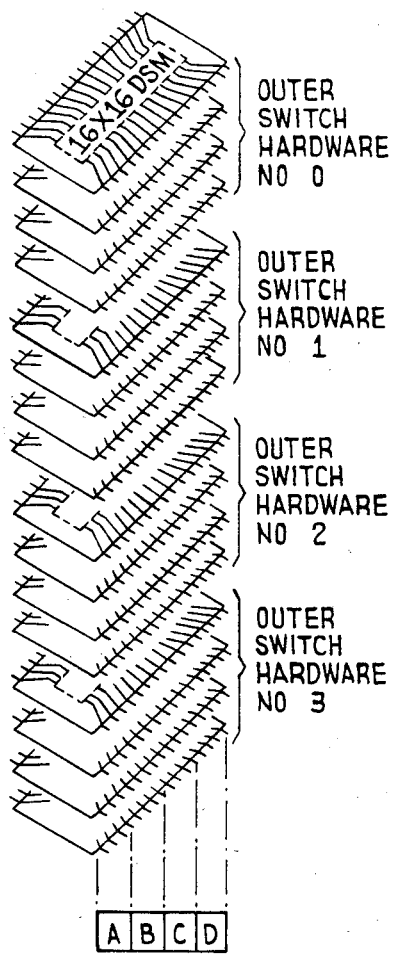
FIG. 8 shows switchblock 10 pair cabling for 256 PCM lines.
Figure 8:
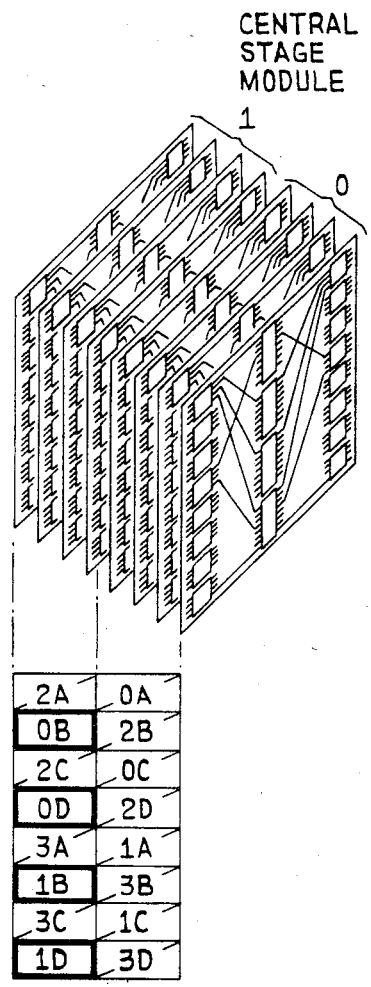
Figure 9:
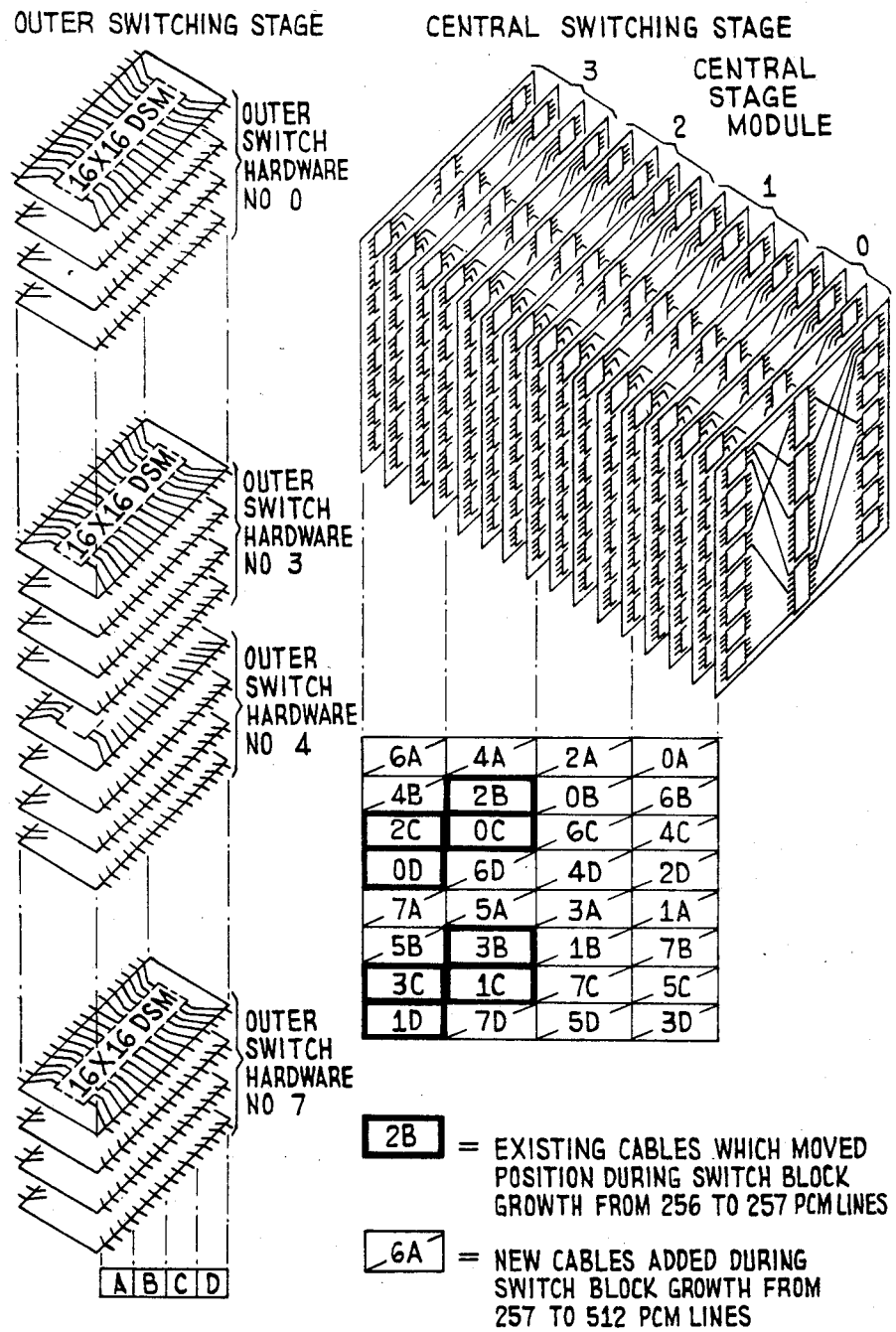
FIG. 9 shows switchblock 10 pair cabling for 512 PCM lines.
Figure 10:
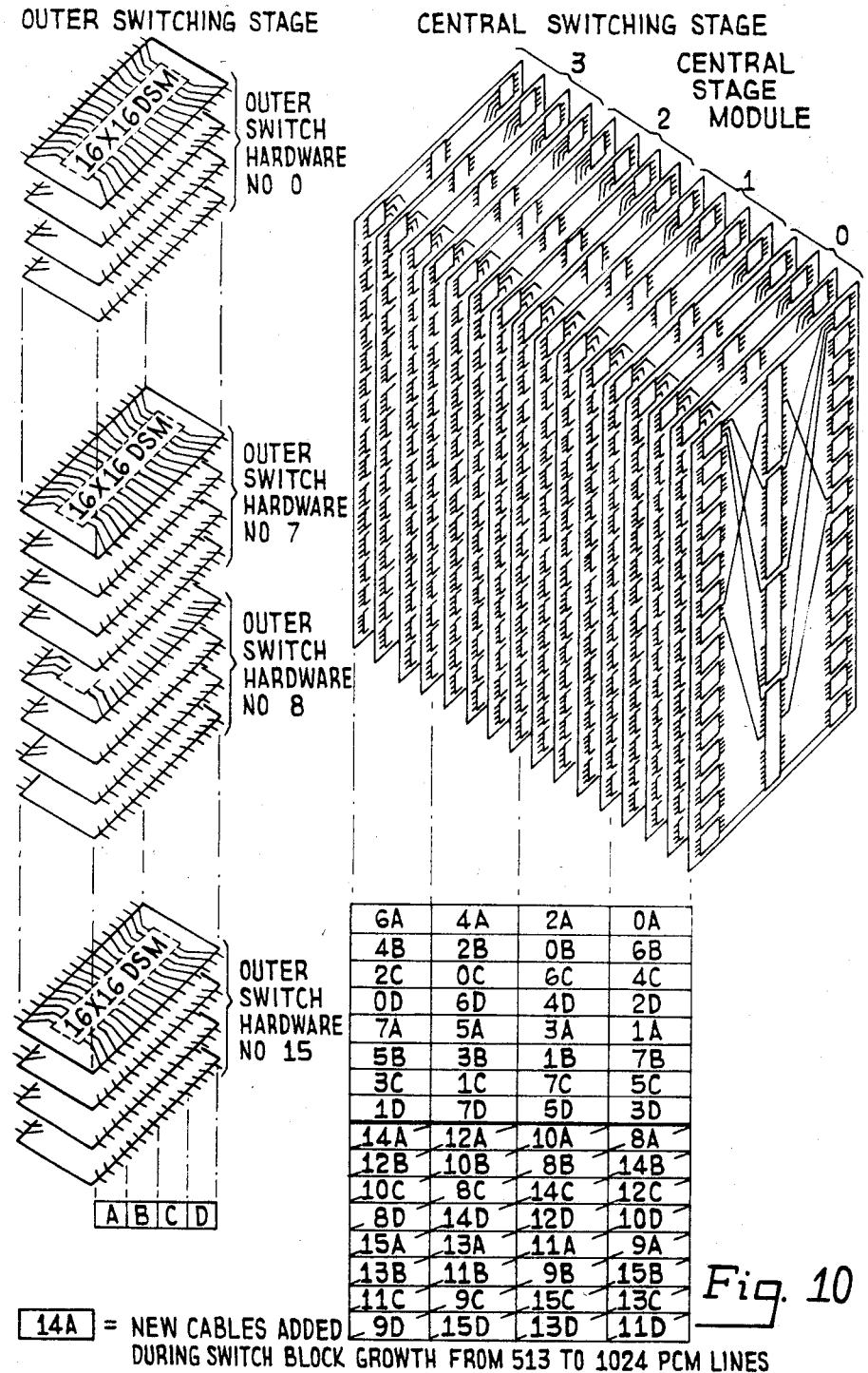
FIG. 10 shows switchblock 10 pair cabling for 1024 PCM lines.

Referring to FIGS. 1-3 it can be seen how the growth of the digital switchblock occurs as the number of PCM lines increase from a first order of 128 lines to a second order of 512 lines. Each time the number of PCM lines increase by sixteen, an outer digital switching module is added to each side of the superplanes. The outer digital switching modules increase in a substantially linear manner. For 128 lines, four superplanes are provided, and eight outer digital switching modules are provided at each side of the superplanes. For 256 lines, eight superplanes are provided, and sixteen outer digital switching modules are provided at each side of the superplanes. For 512 lines, sixteen superplanes are provided, and thirty-two outer digital switching modules are provided at each side of the superplanes. Throughout the range of 128-512 lines there are provided four central digital switching modules in each superplane and each takes the size of an 8×8 matrix. Each superplane includes eight DMR stages at each side of the superplane and are connected to the four central digital switching modules.

Referring to FIGS. 3-6 it can be seen how the growth of the digital switchblock occurs as the number of PCM lines increase from a first order of 512 lines to a second order or 3072 lines. The number of outer digital switching modules continue to increase in a substantially linear manner each time the number of lines is increased by sixteen, and accordingly an outer digital switching module is added at each side of the superplanes. Throughout the range of 512-3072 lines, the number of superplanes remain constant at sixteen. Within the superplanes the DMR stages are increased in substantially linear manner. Eight, sixteen, thirty-two and forty-eight DMR stages are provided, respectively for 512, 1024, 2048 and 3072 lines, at each side of each superplane and are connected to the central digital switching modules, of which there are four in each superplane. Only the central digital switching modules have to be fully equipped over this range. One way of providing growth in the central digital switching modules employs expansion of the digital switching module matrix size. Using a 4×4 digital switching module for example, matrix sizes of 4×4, 8×8, 16×16, 24×24—n4×n4 can be fabricated using $n^2$ modules in a non-blocking square array.

In effect the alteration of the central digital switching module size changes the size of the central superplane which dictates the potential maximum size of switch.

Whenever a switch growth step requires an increase in the number of central superplanes, it becomes necessary to re-arrange the outer to central interconnection links. The choice of inputs and outputs on the central switching stages for connection to the outer switching stages is arbitary, and in FIGS. 7-10 links have been chosen which most clearly illustrate the principles of growth. FIGS. 7-10 show the various stages of growth from 128 PCM lines, using 10 pair cabling for example, and illustrate how the cables are configured. Each 10 pair cable consists of sixteen PCM lines comprising two clock pairs, and eight data pairs each consisting of two PCM lines. Different size cables could allow other growth configurations but would involve moving links to identical positions on the new superplanes. Other forms of transmission media, such as optical fibre or coax could be used, and the PCM line capacity could differ.

In the implementation other criteria has an impact on the actual positions that the links are terminated at the central stage as follows:

(i) Minimising the number of links that require rearrangement when the number of superplanes is increased Only four, eight or sixteen superplanes may be equipped. It is a simple matter to ensure that only half of the existing links are changed when the number of superplanes is doubled.

(ii) Since the superplanes are identical in terms of propogation delay and digital switching module selections for similarly numbered inputs and outputs, it is important that when links are changed they keep the same termination positions on the new superplanes. In this way a switch-block implemented with more than one security level or replica is able to operate satisfactorily with differing numbers of superplanes in each replica during the process of live traffic extension that crosses a link changing growth boundary. In a two security level switch the traffic is locked to one level while the other is updated to the new configuration and returned to service for a short period of two level operation as a check out operation before the update process is repeated on the other security level.

Figure 11:
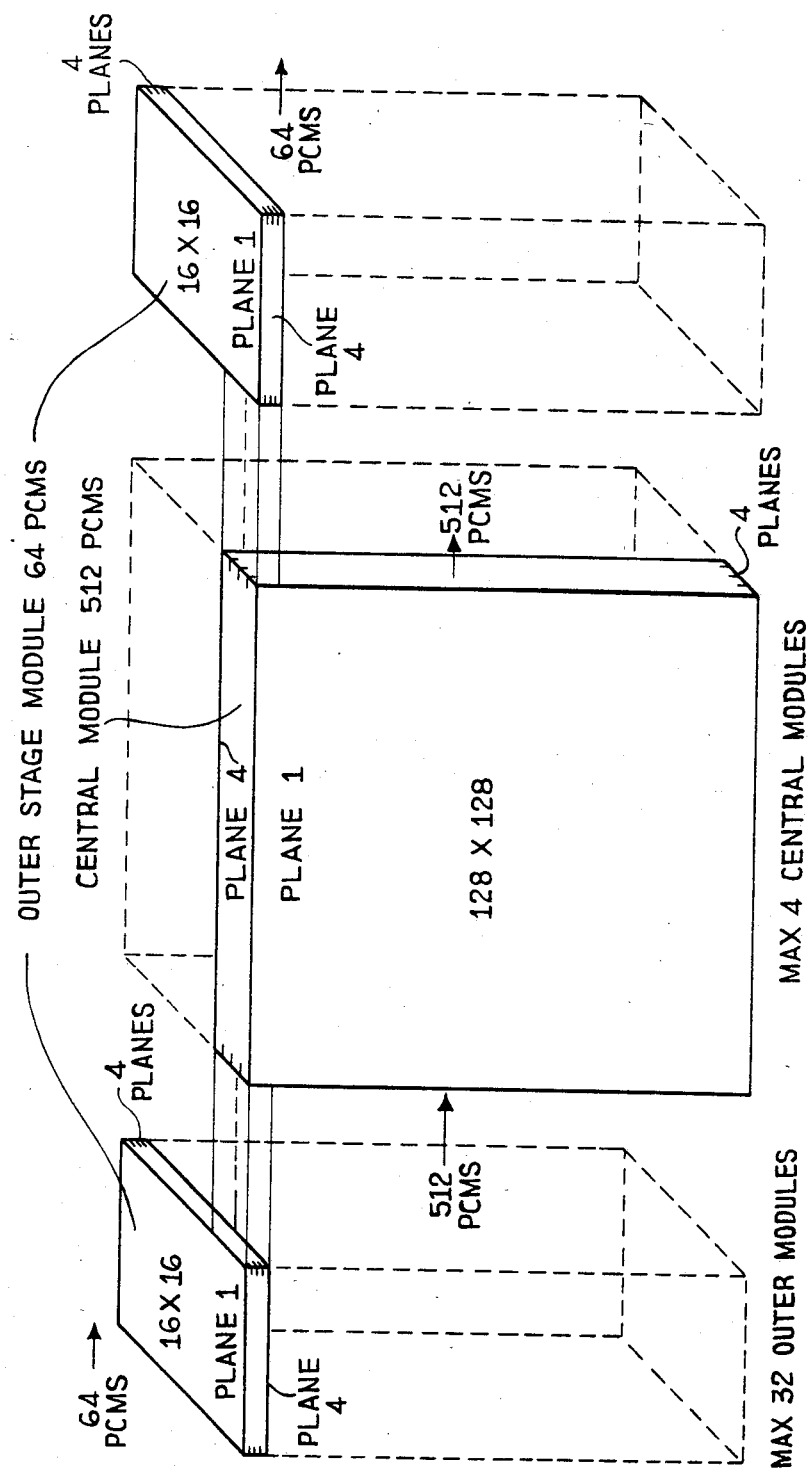
FIG. 11 shows partitioning of the switchblock structure.

For a particular implementation the number of links that require changing can be related to the number of cables used. Consider for example when a cable or optical fibre, for example, carries sixteen links. The module partitioning of the switchblock is shown in FIG. 11 and is based on the commonality of interest imposed by the use of this cable. An outer module houses four receive (RX) and transmit (TX) 16×16 digital switching module planes. The central module contains four superplanes and must be able to accommodate square law growth of the central digital switching module and linear growth of the DMR stages. Since there are four switching planes in the outer module it can be seen how the transmit DMR switching function may be installed at the outer module, enabling the DMR stage equipped at this position for retiming also to take on the role of fixed relationship switching.

FIGS. 12a and 12b summarise the steps taken and the quantities of digital switching modules and DMR stages employed during growth of the switchblock.

I claim:

1. A method of growth of a digital switchblock under live traffic conditions, for use in telecommunications, said switchblock comprising a plurality of superplanes each including a plurality of central digital switching modules which are interconnected to a plurality of demultiplexer-mixer-remultiplexer stages providing input and output connections for the superplanes; and, a plurality of outer digital switching modules which are connected to the demultiplexer-mixer-remultiplexer stages on each side of the superplanes by way of said connections, wherein the outer digital switching modules are increased linearly as the number of telecommunication lines increase from a first number of telecommunication lines to a third number of telecommunication lines, whereas the central digital switching modules increase thereafter in accordance with a square law growth when the number of telecommunication lines increase from the third number of telecommunication lines; and, wherein the method includes the addition of a number of superplanes and the reconfiguration of a number of receive and transmit links as the number of telecommunication lines increase from the first number of telecommunication lines to a second number of telecommunication lines; and, the addition of twice the additional number of superplanes and the reconfiguration of twice the number of receive and transmit links as the number of telecommunication lines increase from the second number to the third number of telecommunication lines.

2. A method of growth of a digital switchblock as claimed in claim 1, wherein, as the number of telecommunication lines increase from the third number of telecommunication lines to a fourth, fifth and sixth number of telecommunication lines, the number of superplanes remain constant and the size of the central digital switch modules increase.

3. A method of growth of a digital switchblock as claimed in claim 1 wherein the number of superplanes added is four and the number of links reconfigured is sixty-four as the number of telecommunication lines is increased from the first number of telecommunication lines to the second number of telecommunication lines; and, the number of superplanes added is eight and the number of links reconfigured is one hundred and twenty-eight as the number of telecommunication lines increase from the second number to the third number of telecommunication lines.

4. A method of growth of a digital switchblock as claimed in claim 2 wherein as the number of telecommunication lines increases from the third number of telecommunication lines to a fourth, fifth and sixth number of telecommunication lines, the central switching modules increase in size to 16×16, 32×32 and 48×48, respectively.

5. A method of growth of a digital switchblock as claimed in claim 1 wherein the superplanes are identical in terms of propagation delay and digital switching module selections for similarly numbered inputs and outputs, and when transmit and receive links are reconfigured the links keep the same termination positions on the new superplane so that a switchblock implemented with more than one security level is able to continue operating with differing numbers of superplanes during live traffic extension.

* * * * *